US010232406B2

(12) United States Patent
Reeser et al.

(10) Patent No.: US 10,232,406 B2
(45) Date of Patent: Mar. 19, 2019

(54) MAGNETICALLY SECURED SCREEN ASSEMBLY FOR A CONVEYOR

(71) Applicant: PPM TECHNOLOGIES HOLDINGS, LLC, Newberg, OR (US)

(72) Inventors: Devin Ray Reeser, Portland, OR (US); Nathan Lee, Milton-Freewater, OR (US); Howard Taylor, Willamina, OR (US)

(73) Assignee: PPM Technologies Holdings, LLC, Newberg, OR (US)

( * ) Notice: Subject to any disclaimer, the term of this patent is extended or adjusted under 35 U.S.C. 154(b) by 0 days.

(21) Appl. No.: 14/991,707

(22) Filed: Jan. 8, 2016

(65) Prior Publication Data
US 2016/0256894 A1 Sep. 8, 2016

Related U.S. Application Data

(60) Provisional application No. 62/101,900, filed on Jan. 9, 2015.

(51) Int. Cl.
| | | |
|---|---|---|
| *B07B 1/49* | (2006.01) | |
| *B07B 1/46* | (2006.01) | |
| *A47J 37/04* | (2006.01) | |
| *B07B 1/00* | (2006.01) | |

(52) U.S. Cl.
CPC .......... *B07B 1/4645* (2013.01); *A47J 37/044* (2013.01); *B07B 1/46* (2013.01); *B07B 1/469* (2013.01); *B07B 1/005* (2013.01); *B07B 2201/02* (2013.01)

(58) Field of Classification Search
CPC ......... B07B 1/005; B07B 1/46; B07B 1/4645; B07B 1/469; B07B 2201/02
USPC ............... 209/395, 399, 401, 403, 405, 409
See application file for complete search history.

(56) References Cited

U.S. PATENT DOCUMENTS

| | | | | |
|---|---|---|---|---|
| 4,840,728 A * | 6/1989 | Connolly | ................. | B07B 1/46 |
| | | | | 209/397 |
| 6,303,241 B1 * | 10/2001 | Miles | .................... | B02C 17/225 |
| | | | | 428/812 |
| 8,822,008 B2 * | 9/2014 | Keough | ........... | B01F 15/00837 |
| | | | | 193/2 R |
| 2008/0169224 A1 * | 7/2008 | Fennekotter | ............. | B07B 1/46 |
| | | | | 209/405 |
| 2011/0151177 A1 * | 6/2011 | Stackpole | ............. | B29C 39/006 |
| | | | | 428/99 |
| 2011/0151178 A1 * | 6/2011 | Stackpole | ................ | B07B 1/46 |
| | | | | 428/99 |
| 2014/0131114 A1 * | 5/2014 | Vasshus | ................... | B07B 1/10 |
| | | | | 175/206 |

\* cited by examiner

*Primary Examiner* — Joseph C Rodriguez
*Assistant Examiner* — Kalyanavenkateshware Kumar
(74) *Attorney, Agent, or Firm* — Mccoy Russell LLP

(57) ABSTRACT

A magnetically retained screen assembly for a conveyor for processing goods is disclosed. The magnetically retained screen assembly includes one or more magnetic screens and one or more magnet assemblies, wherein the one or more magnet assemblies are configured to magnetically retain the one or more magnetic screens within the conveyor support structure.

20 Claims, 15 Drawing Sheets

MAGNETICALLY SECURED SCREEN ASSEMBLY FOR A CONVEYOR

CROSS-REFERENCE TO RELATED APPLICATIONS

The present application claims priority to U.S. Patent Application No. 62/101,900, entitled "MAGNETICALLY SECURED SCREEN ASSEMBLY," filed on Jan. 9, 2015, the entire contents of which are hereby incorporated by reference for all purposes.

BACKGROUND/SUMMARY

In order to meet the current demand for fried snack food products, snack food producers have utilized high throughput processing methods, such as cooking methods. One example of such a method may utilize conveyors to move product through the cooking process. In some embodiments, the conveyors may include a number of screens to sort the desired product. For example, conveyors may be equipped with one or more screens to grade products by size during processing of the product. In other examples, screens may be used to selectively sort differently-sized products. Thus, the screens may preserve the quality of the product, such as cooked product. During use, the screens may accumulate sorted particulate and other materials. In many examples, the screens may need to be changed periodically to prevent clogging of the screen and/or impairment of the size grading capability of the screen which may adversely affect the quality of the finished product. The screens may need to be changed during operation of the conveyor.

Current conveyors have been engineered with removable screens which allow the exchange of the one or more screens while the conveyor is in operation. For example, a conveyor may include a side pull screen configuration where each screen is inserted through a slot in a sidewall of the conveyor and secured in place by one or more clamps. The use of clamps to secure the one or more screens within the conveyor presents several disadvantages.

For example, with the current high throughput cooking systems that utilize conveyors, an operator must hold the one or more clamps open to allow a screen to be pulled from the conveyor. While holding the one or more clamps open, the operator may be potentially exposed to hot product, steam, and/or hot surfaces of the conveyor including the screen and clamp. The operator may further be exposed to potential safety hazards due to the high acceleration motion of the conveyor. Additionally, during operation of the conveyor and especially during changing of the screens, the clamps may rattle loudly presenting a noise hazard.

Another disadvantage of the current example systems is that the clamps provide a multitude of crevices and small surfaces which may accumulate cooking oil residue and/or particulate. Over time these accumulations may result in sanitation issues and/or food safety hazards. Further, the multitude of crevices and small surfaces of each clamp may result in increased labor costs to maintain cleanliness standards as well as reduction of the operational time of the conveyor.

In addition, the repeated opening and closing of the clamps and/or other vibration/mechanical stresses upon each clamp may result in wear and/or stress fatigue of the clamp over time. The periodic maintenance and/or replacement of the clamps may result in increased maintenance costs, increased labor costs to perform the maintenance, and reduced operational time of the conveyor.

The inventors herein have recognized the above described deficiencies of the current designs for securing the one or more screens within a conveyor for processing food products and disclose a magnetically secured screen assembly to retain the one or more screens within the conveyor.

DETAILED DESCRIPTION

Figure 1:
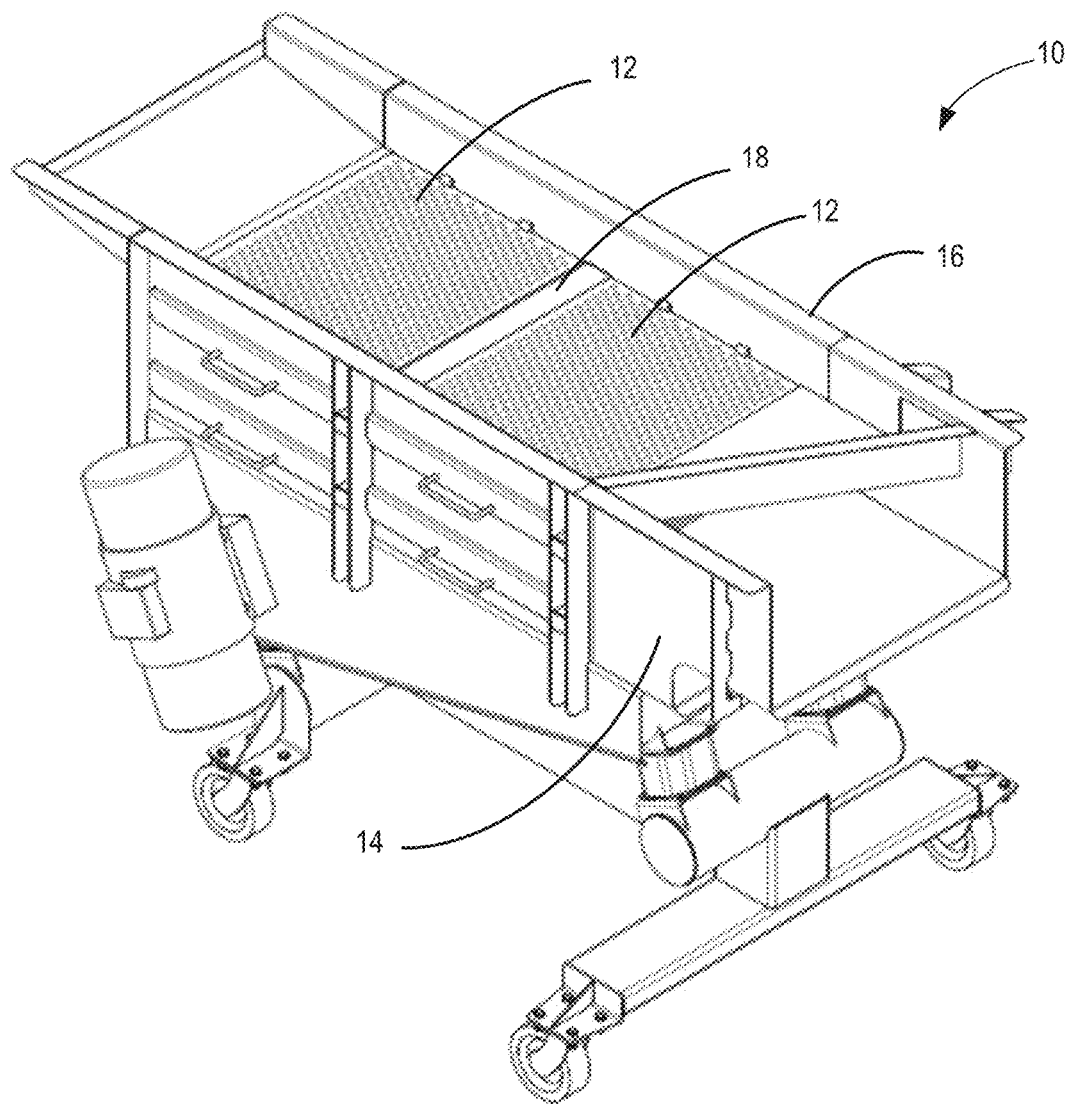
FIG. 1 illustrates a perspective view of conveyor including a magnetically secured screen assembly in accordance with an embodiment of the present disclosure.

The embodiments provided herein disclose a magnetically secured screen assembly for a conveyor, such as a food product conveyor. The conveyor may be integrated or used as a processing conveyor. Such processing may include one or more of cooking, sorting, drying, coating, or any other process which may benefit from the use of a screen conveyor. In one example embodiment, a magnetically secured screen assembly is provided including a conveyor support structure and one or more magnetically secured screens. An example embodiment provides a clamp-free design to secure the one or more screens within the conveyor support structure which may allow an operator to maintain both hands free while changing the screens thus reducing safety hazards such as exposure of the operator to the motion of the conveyor as well as to environmental conditions from the conveyor or food product, e.g. steam, hot cooked product, and hot surfaces. In one example, as described in more detail below, the magnetically secured screen assembly may include one or more magnetic screens and one or more installable magnetic retainer assemblies. In some examples, the magnetic retainer assemblies may be installed into an existing conveyor support structure.

As discussed in further detail below, a magnetically secured screen assembly may employ a magnetic coupling force to secure one or more screens within a trough of a conveyor support structure. The screen may be oriented within the conveyor support structure such that the screen is supported by one or more structural elements of the conveyor support structure and retained in place by the magnetic coupling force of one or more magnet assemblies. Thus, the screen may be oriented horizontally, vertically, at an angle, or any other suitable orientation within the conveyor support structure. In some examples, the conveyor support structure may be configured such that the one or more screens are oriented below a path of conveyance of the product within the trough. Alternatively, the conveyor support structure may be configured such that the one or more screens may be oriented above the path of conveyance of the product within the trough. In even other examples, the conveyor support structure may be configured such that one or more screens may be oriented below the path of conveyance of the product within the trough and one or more screens may be oriented above the path of conveyance of the product within the trough. In other configurations, the trough of the conveyor may be partitioned into two or more regions, where each region may include one or more magnetically retained screens. In some configurations, the divider may be a solid plate, perforated plate, an additional screen, or additional structural features for installing the one or more magnet assemblies within the trough of the conveyor structural assembly.

The disclosed magnetically secured screen assembly illustrated in FIGS. 1-7B provides a conveyor including a magnetically retained screen assembly. The magnetically retained screen assembly may include one or more magnet assemblies installed within the conveyor support housing and one or more magnetic screens. Additionally, the magnetically secured screen assembly may be fabricated with the conveyor or may be installed within an existing conveyor as part of a retrofitting process.

FIG. 1 illustrates a perspective view of a conveyor 10 including a conveyor support structure and one or more magnetic screens 12. In this specific example, four magnetic screens 12 are arranged in two upper and lower magnetic screen configurations along a longitudinal length of the conveyor support structure. Although shown with the upper and lower configuration, any other suitable configuration is considered within the scope of the disclosure. In the illustrated example, each of the one or more magnetically secured screens 12 may be inserted into conveyor 10 at front side wall 14 and traverse the conveyor 10 laterally to rear sidewall 16 providing a side pull configuration to conveyor 10. Further, in this example, a divider 18 may partition the conveyor 10 into two regions, where each region includes an upper and lower magnetic screen 12.

Figure 2:
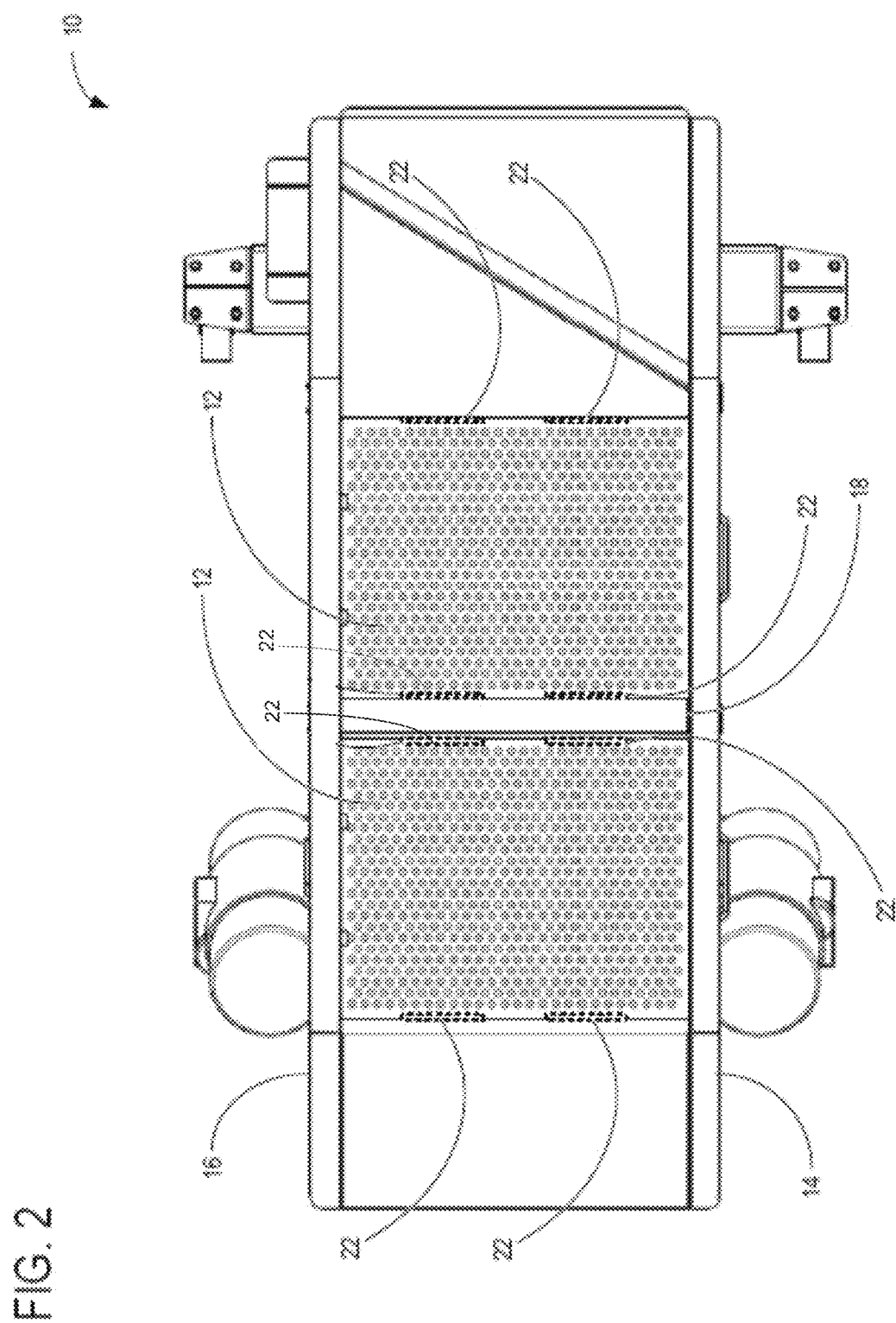
FIG. 2 illustrates a top view of the conveyor including a magnetically secured screen assembly of FIG. 1 in accordance with an embodiment of the present disclosure.

FIG. 2 illustrates a top view of conveyor 10. The one or more magnetic screens 12 may be configured to bear upon the one or more magnet assemblies 22 (shown in broken line) such that magnetic coupling force between the one or more magnetic screens 12 and the one or more magnet assemblies 22 may retain the magnetic screen in place. In other words, the magnetic coupling force holds the one or more magnetic screens 12 against the one or more magnet assemblies 22 preventing the one or more magnetic screens 12 from moving in the vertical direction. Conveyor 10 may include a pair of magnet assemblies 22 mounted on a wall of the conveyor support structure and on both sides of divider 18 as shown, on front sidewall 14, rear sidewall 16, or any other suitable structural feature, such as a magnet assembly mount, for example, of the conveyor support structure. As discussed above, conveyor 10 may be configured with a single divider 18 as shown, with a plurality of dividers, or without a divider. Further, divider 18 may comprise a solid plate, a perforated plate, screen, or any other suitable partition structure.

Figure 3:
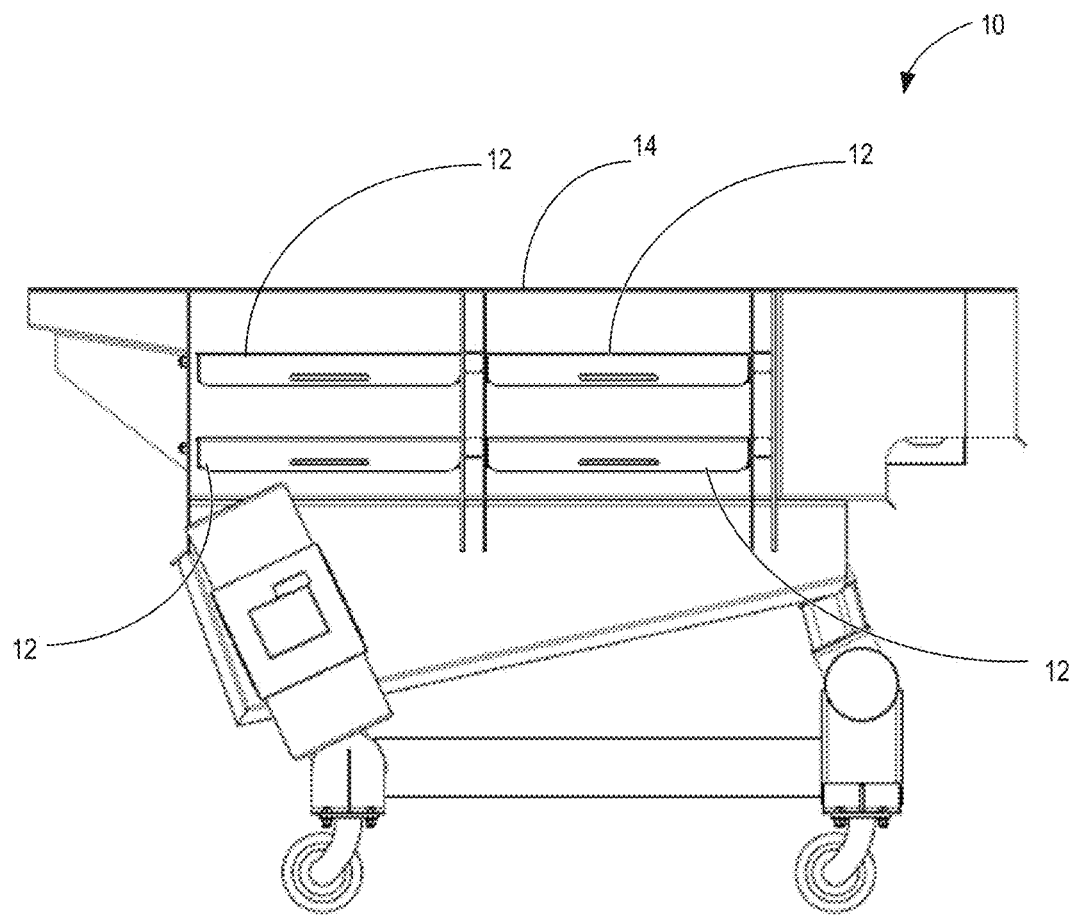
FIG. 3 illustrates a side view of the conveyor including a magnetically secured screen assembly of FIG. 1 in accordance with an embodiment of the present disclosure.

FIG. 3 illustrates a side view of conveyor 10 showing the one or more magnetic screens 12 installed at front sidewall 14 of conveyor 10. The side pull configuration of the one or more magnetic screens 12 may allow each of the one or more magnetic screens 12 to be removed from conveyor 10 by an operator pulling a magnetic screen 12 with sufficient force to overcome the magnetic coupling force between a magnetic screen 12 and the one or more magnet assemblies 22 in contact with the magnetic screen 12.

Figure 4:
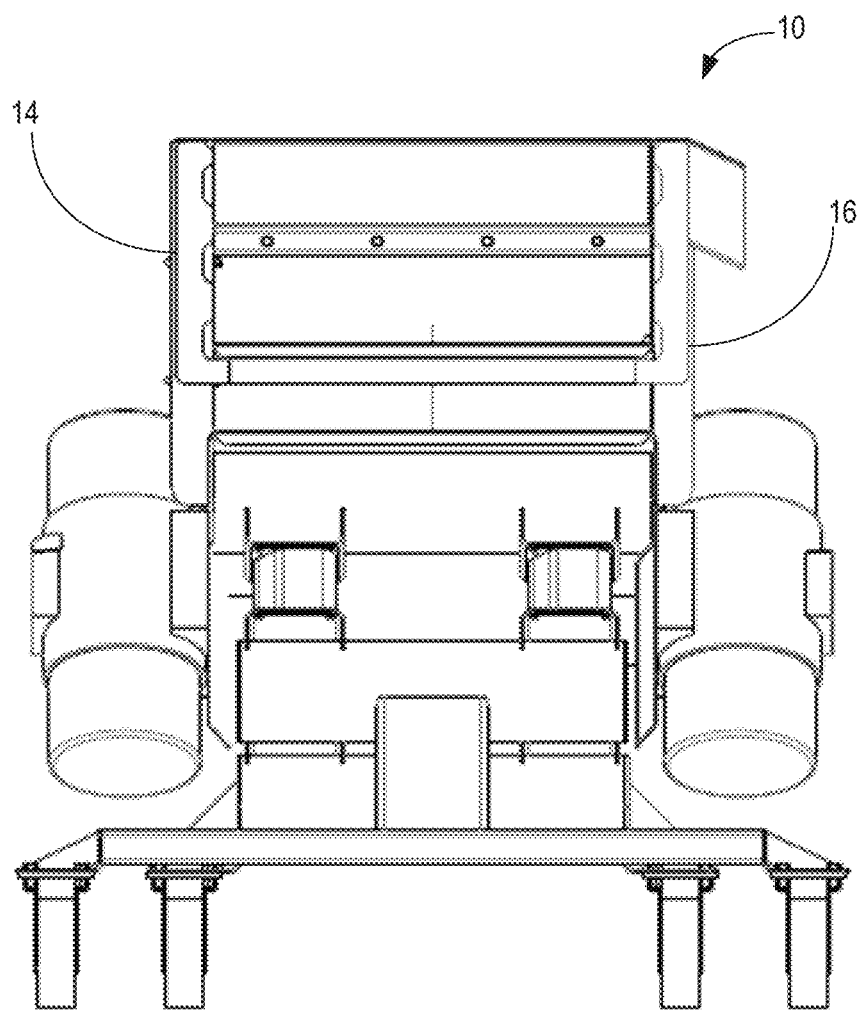
FIG. 4 illustrates an end on view of the conveyor including a magnetically secured screen assembly of FIG. 1 in accordance with an embodiment of the present disclosure.

FIG. 4 illustrates an end view of conveyor 10 in accordance with an embodiment of the present disclosure.

Figure 5:
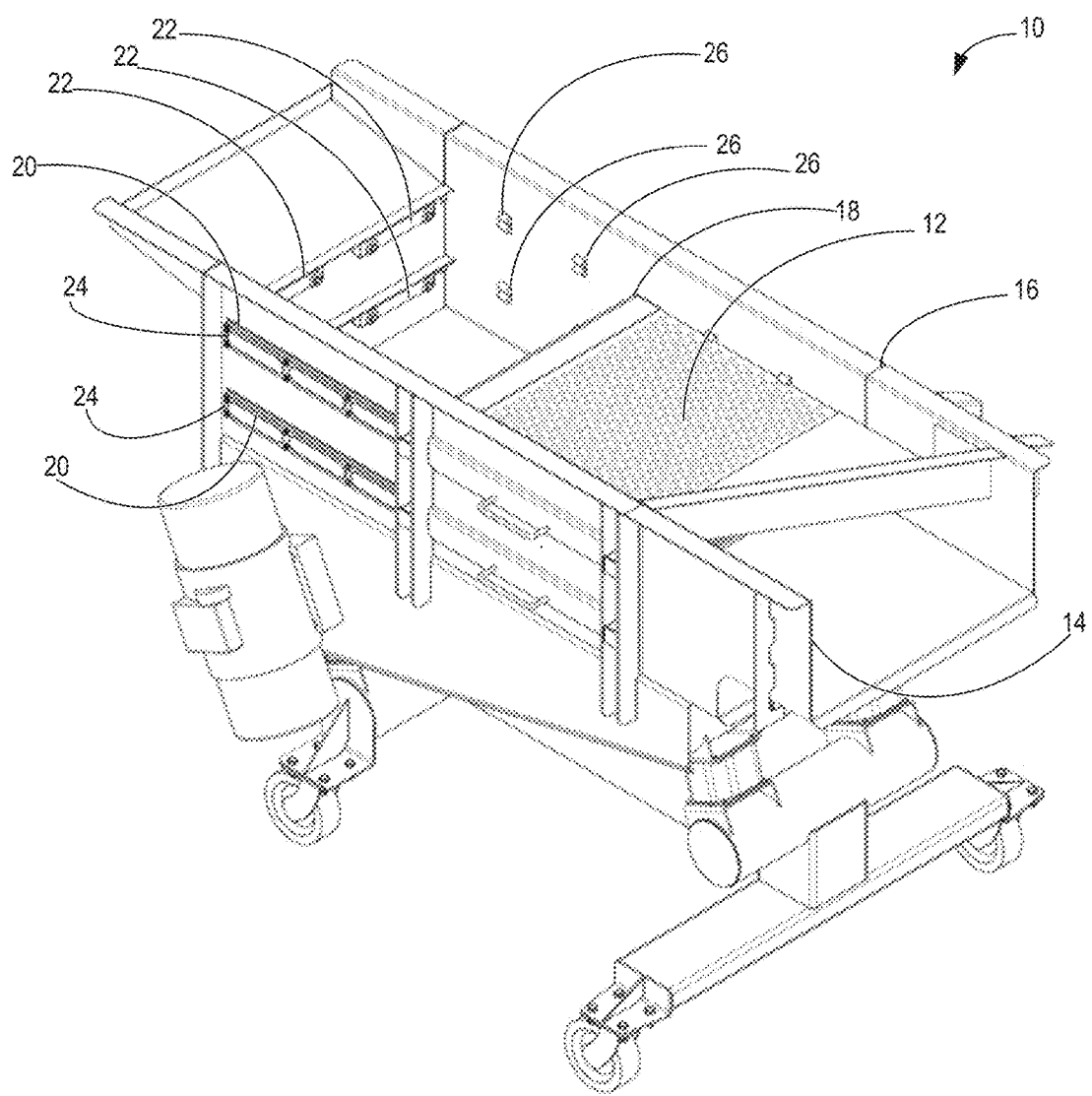
FIG. 5 illustrates a second perspective view of the conveyor including a magnetically secured screen assembly of FIG. 1 with magnetic screens removed in accordance with an embodiment of the present disclosure.

FIG. 5 illustrates a second perspective view of conveyor 10 where two magnetic screens 12 have been removed. Conveyor 10 may include one or more slots 20 in front sidewall 14. Each slot 20 may be configured to allow a magnetic screen 12 to be inserted into conveyor 10. Further, slot 20 may allow front sidewall 14 to support magnetic screen 12 at one end. Rear sidewall 16 may include one or more screen supports 26. The one or more screen supports 26 may be configured to support magnetic screen 12 at rear sidewall 16. Screen support 26 may include a slot to receive the end of magnetic screen 12, a clip, a clamp, a shelf, or any other suitable structure configured to support magnetic screen 12 within conveyor 10. Further, conveyor 10 may include one or more screen supports 26 at rear sidewall 16 as required to support the weight of magnetic screen 12. In the specific example of FIG. 5, two screen supports 26 are provided at rear sidewall 16 for each of the one or more magnetic screens 12. Each screen support 26 may be fabricated of two pieces of round stock fixedly attached to rear sidewall 16 and configured such that magnetic screen 12 is held in place within screen support 26 by a pinching force exerted upon magnetic screen 12 by screen support 26.

Conveyor 10 may also include one or more structural elements to provide lateral support to each of the one or more magnetic screens 12. In this specific example, conveyor 10 may also include one or more lateral magnet assemblies 24 on front sidewall 14. Lateral magnet assemblies 24 may be located on front sidewall 14 such that a magnetic coupling force between a lateral magnet assembly 24 and magnetic screen 12 may laterally retain magnetic screen 12 within conveyor 10. A lateral magnet assembly 24 may be located immediately below each slot 20 within front sidewall 14 as illustrated. In some examples, lateral magnet assembly 24 may be located above slot 20 or on either side of slot 20. In other examples, a plurality of lateral magnet assemblies may be included for each magnetic screen 12. In still other examples, conveyor 10 may include clamps, clips, or any other suitable structural element to prevent lateral displacement of each of the one or more magnetic screens 12 within conveyor 10.

Figure 6:
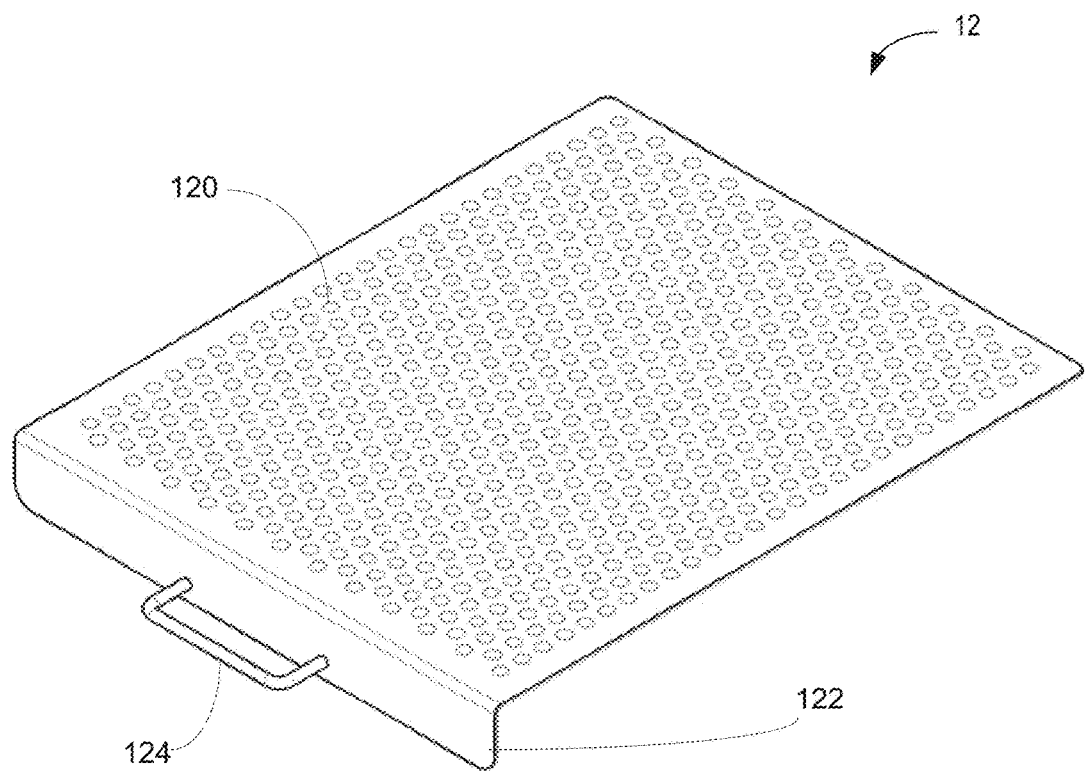
FIG. 6 illustrates a perspective view of a magnetic screen in accordance with an embodiment of the present disclosure.

Turning now to FIG. 6, the structural features of a representative magnetic screen 12 will now be discussed. FIG. 6 illustrates a perspective view of a magnetic screen 12. Each magnetic screen 12 may include a screen 120, flange 122, and handle 124. Screen 120 may include a plurality of holes sized to prevent the passage of particles greater than the diameter of the holes through screen 120. The diameter of the plurality of holes within screen 120 may be specifically sized for a given final product such that screen 120 may grade large and or small product from the finished product. It will be appreciated that in the tiered configuration of the present embodiment, an upper magnetic screen may be configured with a different hole diameter than a lower magnetic screen. It will be further appreciated that the hole diameter for each of the one or more magnetic screens may vary between each of the one or more magnetic screens within conveyor 10.

Screen 120 may comprise a magnetic stainless steel alloy or any other suitable magnetic, heat resistant, and corrosion resistant alloy. It will be appreciated that screen 120 may be comprised of non-magnetic alloy with regions of magnetic alloy fixedly attached to facilitate magnetic coupling. The regions of magnetic alloy may include tabs, exterior structures, and/or interior regions within screen 120.

Magnetic screen 12 may include a flange 122 configured to extend downward to contact one or more lateral magnet assemblies. Thus a magnetic coupling force between flange 122 and one or more lateral magnet assemblies may laterally retain magnetic screen 12 within conveyor 10. In some examples, flange 122 may be configured such that the magnetic screen may be physically retained within conveyor 10. It will be appreciated that flange 122 may be configured in a substantially rectangular shape as illustrated or in any other suitable shape. It will be further appreciated that in some embodiments, flange 122 may extend upward above the plane of screen 120. In other examples, magnetic screen 12 may not include flange 122. Flange 122 may be comprised of a magnetic stainless steel alloy or any other suitable magnetic, heat resistant, and corrosion resistant alloy. As discussed above with respect to screen 120, flange 122 may be comprised of non-magnetic alloy with regions of magnetic alloy fixedly attached to facilitate magnetic coupling. Screen 120 and flange 122 may be fabricated from a single piece of metal or flange 122 may be fixedly attached to screen 120 by welds, for example. In examples where magnetic screen 120 is not laterally retained by a magnetic coupling force, flange 122 may be comprised entirely of non-magnetic alloy.

In other examples, screen 120 and flange 122 may be comprised of or include magnets capable of generating a magnetic coupling force with the magnet assemblies 22 and lateral magnet assemblies 24 described or other magnetic structural elements of conveyor 10.

Handle 124 may be fixedly attached to magnetic screen 12 at flange 122. An operator may grasp handle 124 to insert or remove magnetic screen 12 from conveyor 10. It will be appreciated that handle 124 may be welded, bolted, or fixedly attached by any attachment of sufficient strength to transmit force applied to handle 124 to the other components of magnetic screen 12. In some embodiments, handle 124 may be integrated within the screen, replaced by a slot or other suitable structural feature. In other embodiments, magnetic screen 12 may not include a handle 124.

Figure 7A:
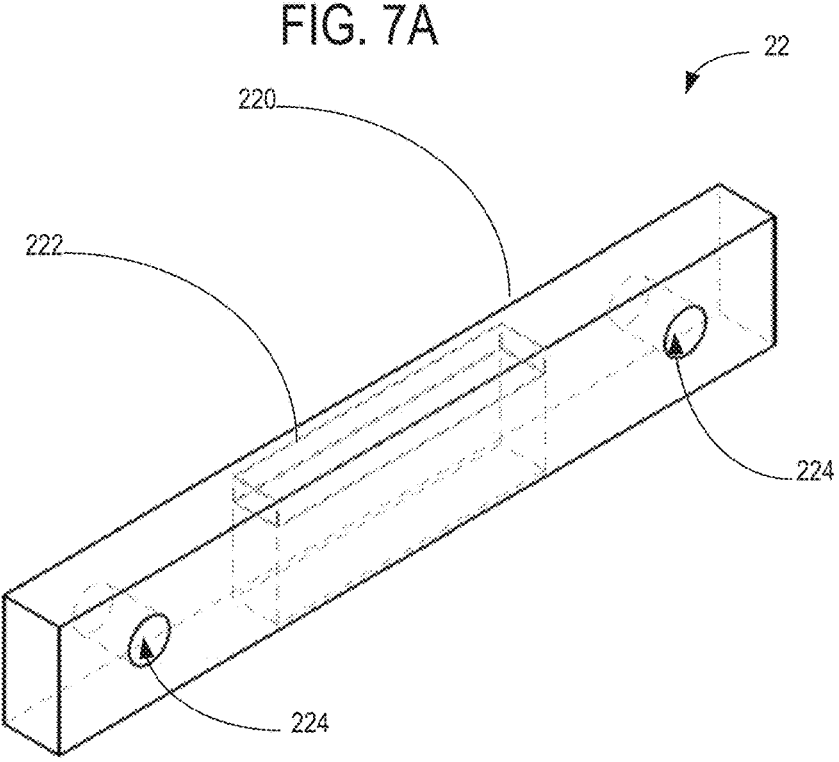
FIG. 7A illustrates a perspective view of a magnet assembly in accordance with an embodiment of the present disclosure.

FIG. 7A illustrates a perspective view of a respective magnet assembly 22. Magnet assembly 22 may comprise a casing 220, one or more magnets 222, and one or more magnet assembly fastening structures 224. In this specific example magnet assembly fastening structure is a hole through a lateral thickness of the plastic casing of magnet assembly 22. Magnet assembly fastening structures may be configured to facilitate attachment of the magnet assembly 22 within conveyor 10. Magnet assembly 22 may be attached within conveyor 10 by bolts, clips, clamps, screws, or any other suitable means.

Casing 220 may comprise an ultra-high molecular weight (UHMW) plastic or any other suitable heat resistant material. Furthermore, the material of casing 220 may be selected so as to not adversely affect the magnetic coupling forces between the one or more magnets 222 and magnetic screen 12. The UHMW plastic may resist heat and provide an easily maintained surface for sanitary purposes. In some examples a stainless steel or other suitable alloy plate may be fixedly attached to the exterior surfaces of casing 220. In other examples, one or more surfaces of the one or more magnets 222 may be exposed to the interior of conveyor 10.

Figure 8A:
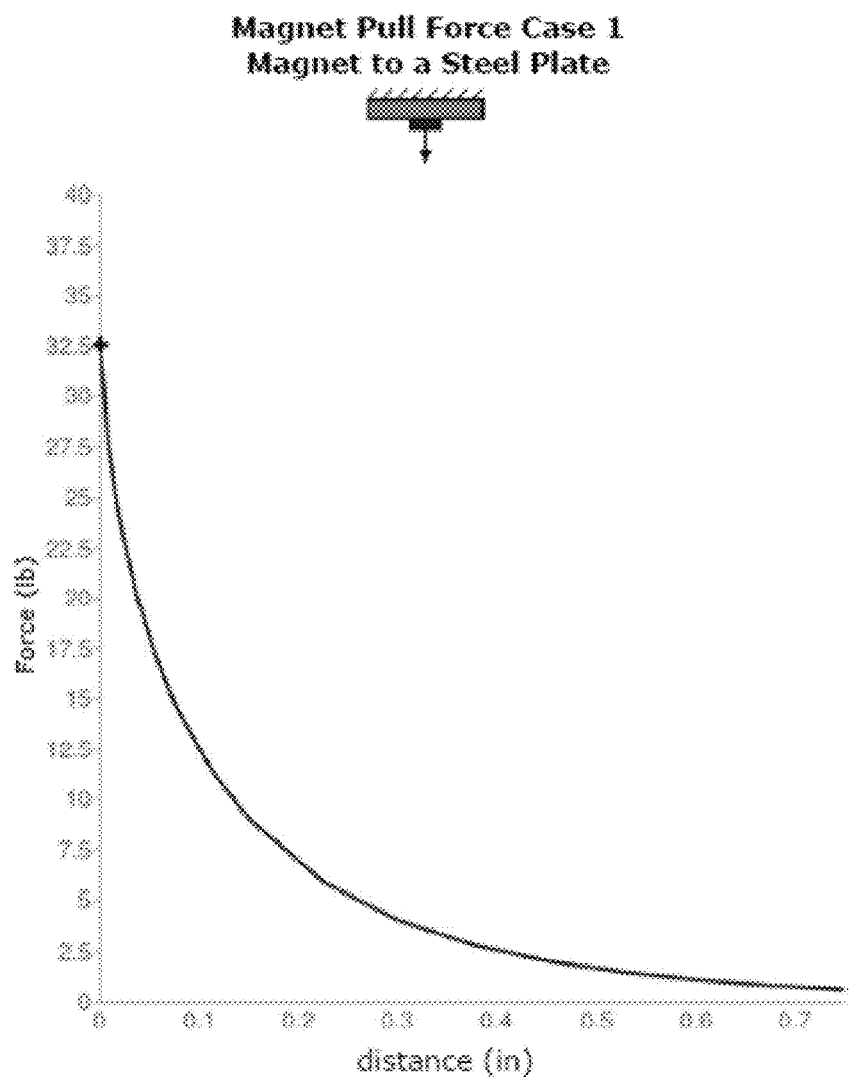
FIG. 8A illustrates a graph of magnet pull force versus distance for an example magnet for a magnet assembly of FIG. 7A in accordance with an embodiment of the present disclose.

Casing 220 may be further configured to house magnet 222 within an interior of casing 220. In this configuration, an interior void may be machined into casing 220. After installation, the interior void may be filled to retain the one or more magnets 222 within casing 220 with the proper orientation toward a surface of casing 220 nearest the magnetic screen 12 when installed for efficient magnetic coupling to the magnetic screen 12. In this specific example casing 220 is configured such that the one or more magnets 222 is approximately 0.0825 inches from a surface of an installed magnetic screen 12. It will be appreciated that the distance between magnet 222 and an installed magnetic screen 12 may vary based upon the strength, composition, and type of magnet used. Magnet 222 may comprise rare earth magnets, electromagnets, or any other suitable magnetic alloy capable of generating a suitable magnetic coupling force. FIG. 8A illustrates a graph of pull force (magnetic coupling force) versus distance for an example magnet 222. Other magnets are considered and are part of the disclosure.

Figure 7B:
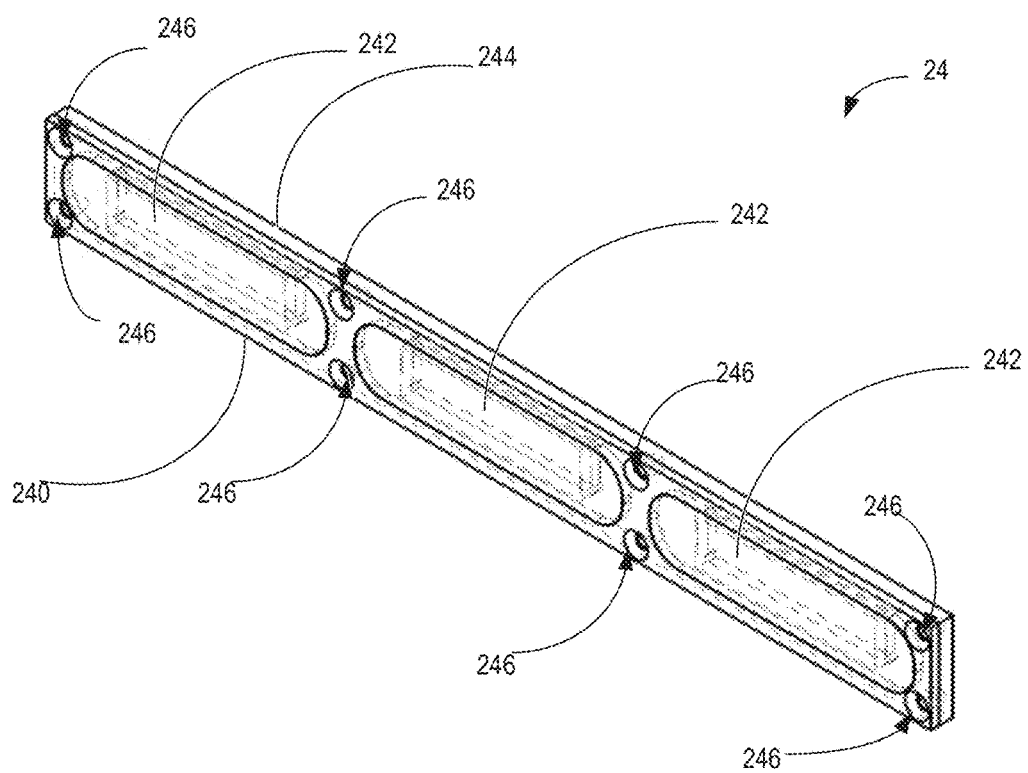
FIG. 7B illustrates a perspective view of lateral magnet assembly in accordance with an embodiment of the present disclosure.

FIG. 7B illustrates a perspective view of a representative lateral magnet assembly 24. Lateral magnet assembly 24 may comprise a face plate 240, casing 244, one or more lateral magnets 242, and one or more lateral magnet assembly fastening structures 246. In this specific example, the lateral magnet assembly fastening structure is a hole through a lateral thickness of faceplate 242 and casing 244 of lateral magnet assembly 24. Lateral magnet assembly fastening structure 246 may be configured to facilitate attachment of the lateral magnet assembly 24 to an exterior surface of front sidewall 14 as illustrated in FIGS. 1-5. Lateral magnet assembly 24 may be attached to front sidewall 14 by bolts, clips, clamps, screws, or any other suitable means.

Faceplate 240 may comprise a stainless steel alloy plate or other suitable heat and corrosion resistant alloy. In the illustrated example, faceplate 242 is machined with one or more holes machined through a lateral thickness of faceplate 242 to minimize interference with the magnetic coupling force between the one or more lateral magnets 242 and magnetic screen 12.

Casing 244 may comprise an ultra-high molecular weight (UHMW) plastic or any other suitable heat resistant material. Furthermore, the material of casing 244 may be selected so as to not adversely affect the magnetic coupling forces between the one or more lateral magnets 242 and magnetic screen 12. The UHMW plastic may resist heat and provide an easily maintained surface for sanitary purposes. In some examples a stainless steel or other suitable alloy plate may be fixedly attached or otherwise coupled to the exterior surfaces of casing 244. In other examples, one or more surfaces of the one or more lateral magnets 242 may exposed to the interior of conveyor 10.

Figure 8B:
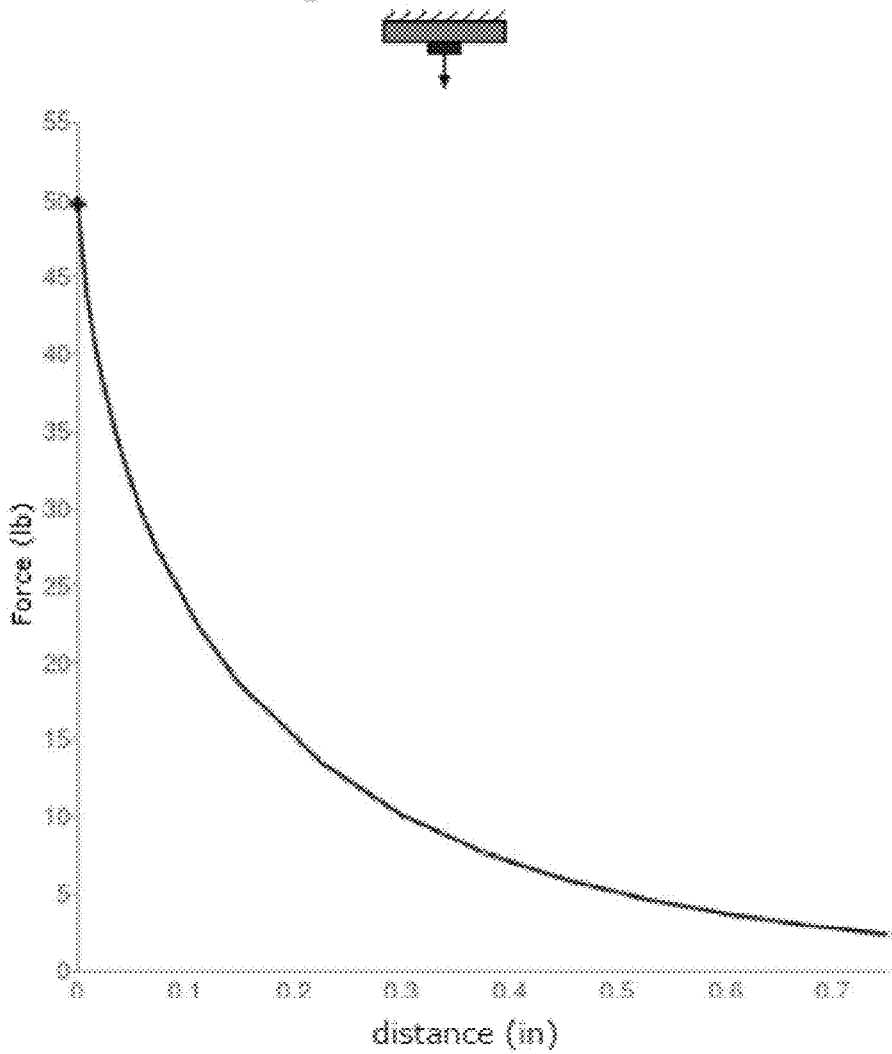
FIG. 8B illustrates a graph of magnetic pull force versus distance from an example magnet for a lateral magnet assembly of FIG. 7B in accordance with an embodiment of the present disclosure.

Casing 244 may be further configured to house one or more lateral magnets 242 within an interior of casing 244. In this configuration, an interior void for each of the one or more lateral magnets 242 may be machined into casing 244. After installing each lateral magnet 242, each interior void may be filled to retain the one or more lateral magnets 242 within casing 244 with the proper orientation for efficient magnetic coupling to magnetic screen 12. In this specific example casing 244 is configured such that each lateral magnet 242 is approximately 0.0825 inches from a surface of an installed magnetic screen 12. It will be appreciated that the distance between lateral magnet 242 and an installed magnetic screen 12 may vary based upon the strength, composition, quantity, and type of magnet used. Lateral magnet 242 may comprise rare earth magnets, electromagnets, or any other suitable magnetic alloy capable of generating a suitable magnetic coupling force. FIG. 8B illustrates a graph of pull force (magnetic coupling force) versus distance for an example lateral magnet 242.

As described above with regard the embodiment of conveyor 10, magnet assemblies 22, lateral magnet assemblies 24, screen supports 26, and magnetic screens 12 may comprise a magnetic screen assembly which may be installed within an existing conveyor. In this alternative embodiment, each component may be installed within an existing conveyor, replace existing components, and/or may be modified or fabricated to fit the specific geometries of the existing conveyor.

Figure 9:
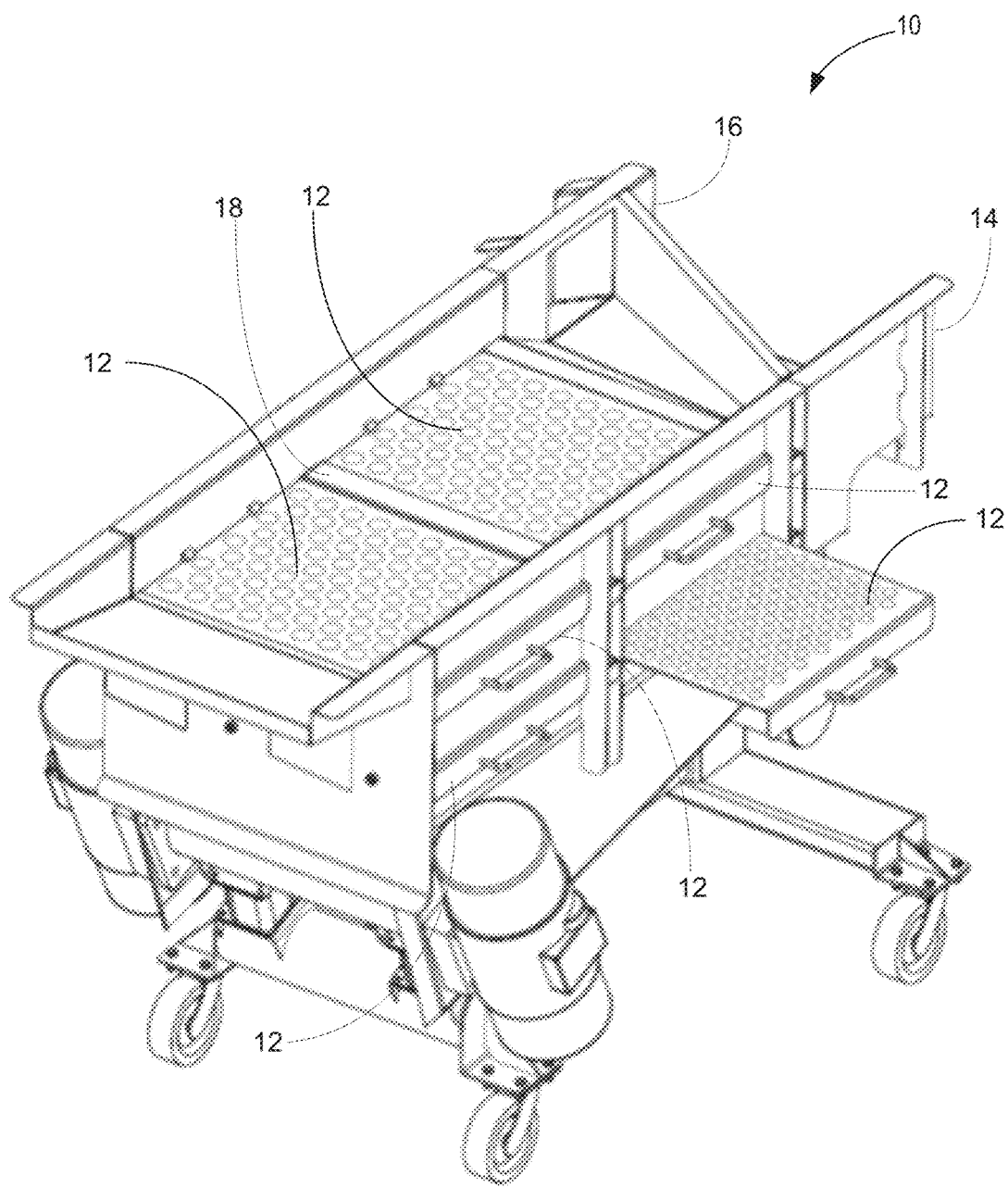
FIG. 9 illustrates another perspective view of the conveyor including a magnetically secured screen assembly of FIG. 1.
Figure 10:
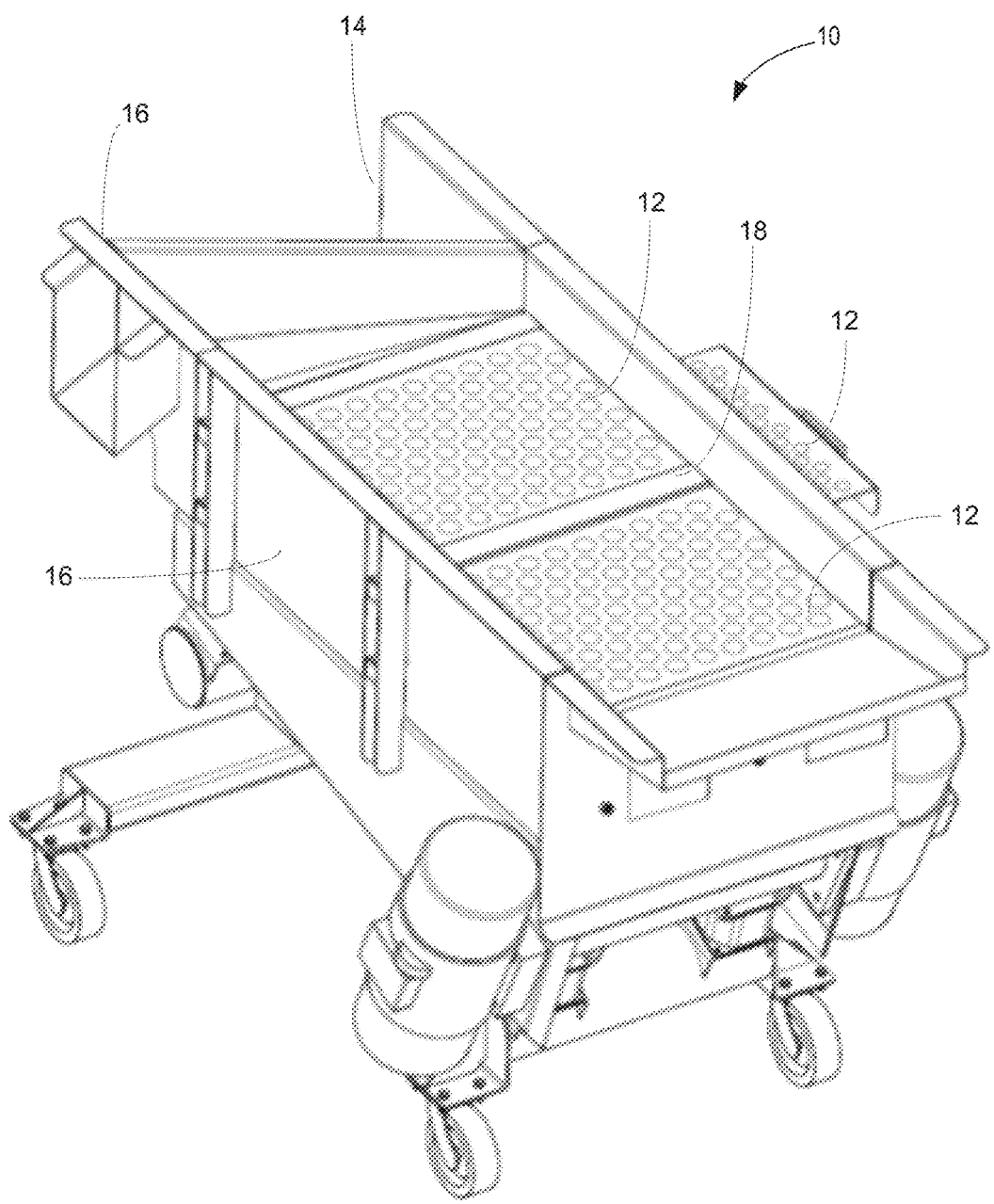
FIG. 10 illustrates another perspective view of the conveyor including a magnetically secured screen assembly of FIG. 1.

FIGS. 9-15 illustrate a specific embodiment for the magnetically secured screen assembly described above. It should be appreciated that the figures provide an illustrative example and are not intended to be limiting in any way. Specifically, FIG. 9 provides an illustration of a front perspective view of the conveyor including a magnetically secured screen assembly similar to the assembly shown in FIG. 1. FIG. 10 provides a rear perspective view of the conveyor including the magnetically secured screen assembly.

Figure 11:
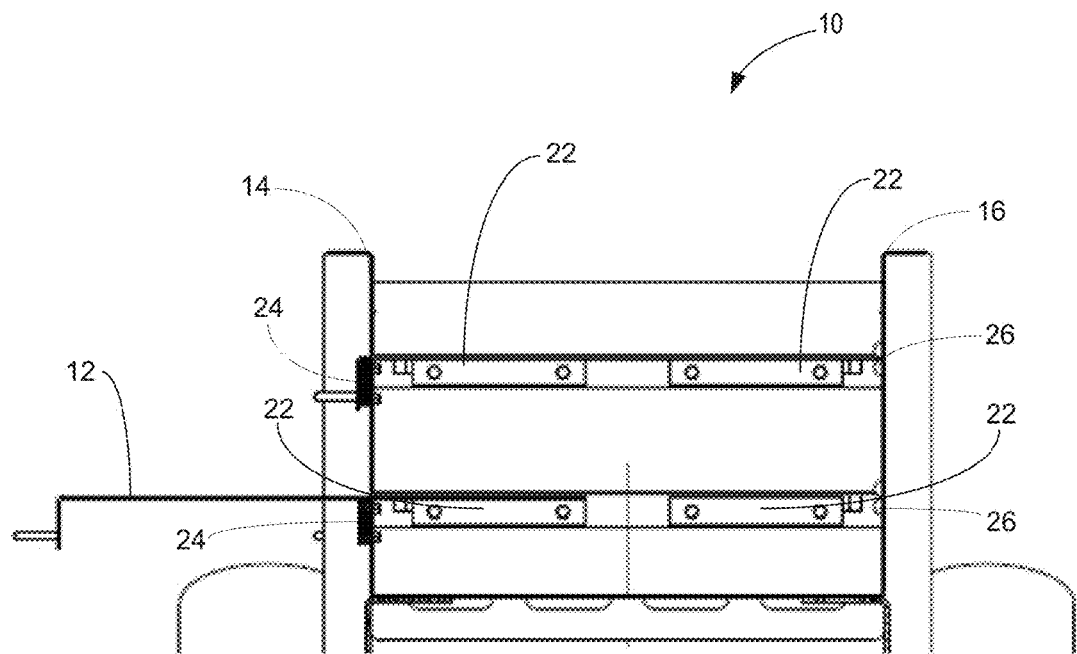
FIG. 11 illustrates an end view of the interior conveyor including a magnetically secured screen assembly of FIG. 1.
Figure 12:
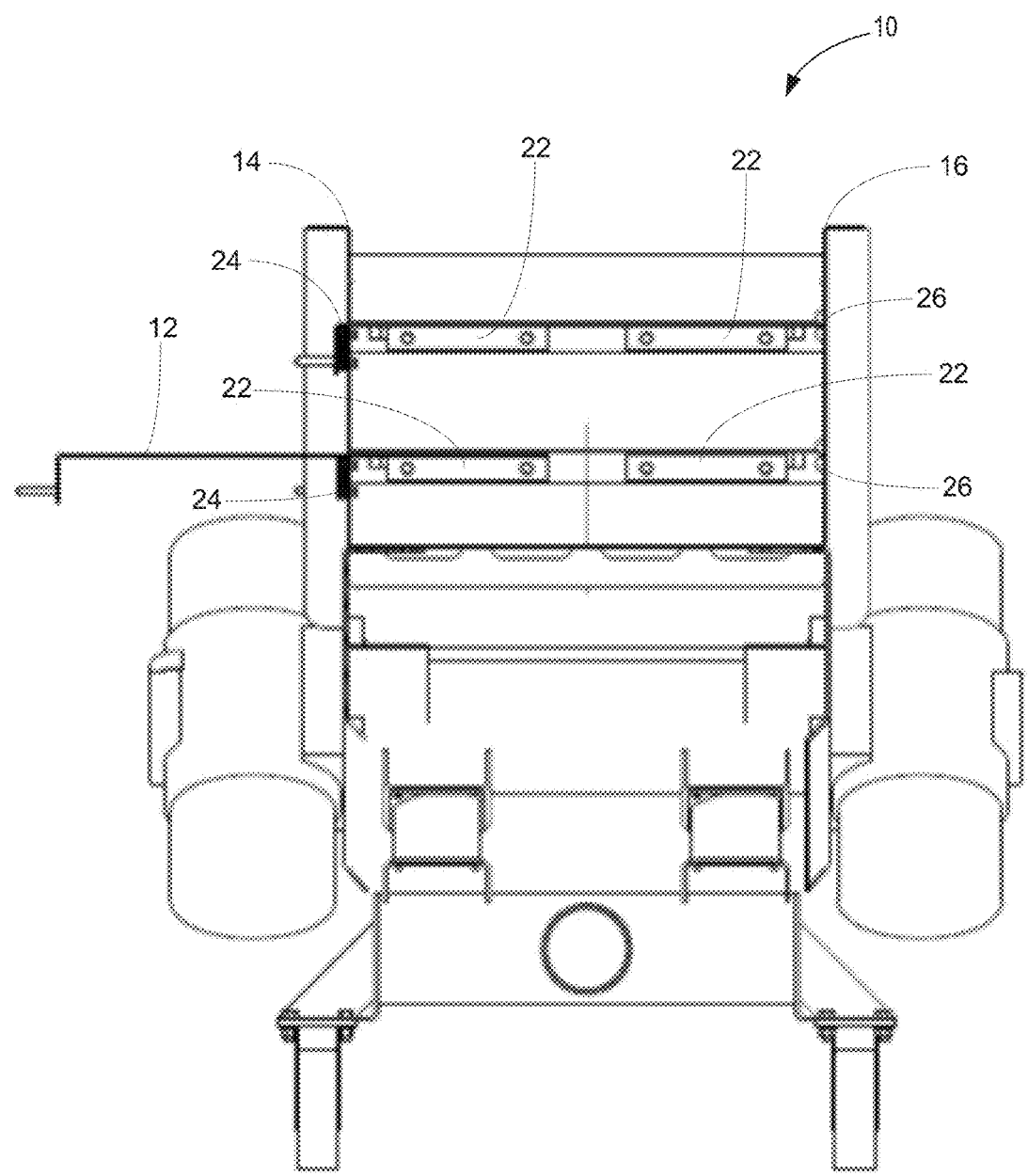
FIG. 12 illustrates another perspective view of the conveyor including a magnetically secured screen assembly of FIG. 1.

For reference, FIG. 11 provides an end view of the interior conveyor including the magnetically secured screen assembly and a magnetic screen 12. In this figure, the interior components such as the magnetic assemblies 22 that may be positioned horizontally between a front sidewall 14 and a rear sidewall 16 and the screen supports 26 are shown. FIG. 12 is another perspective view of the conveyor including a magnetically secured screen assembly with one of the magnetic screens removed. In this illustration, it is possible to view the horizontally positioned magnet assembly 22 which may lie on an interior wall of the conveyor 10 between a front sidewall 14 and rear sidewall 16, as well as the lateral magnetic assembly 24 which may be affixed to the exterior surface of the front sidewall 14. In this view, it is also possible to view the screen supports 26 provided on the interior surfaces of the conveyor 10. As shown in the figure, the magnetic screens 12 may be inserted into the conveyor 10 and the screens 12 may be supported by the screen supports 26 and may further be held in place via the horizontally positioned magnetic assemblies 22 and a lateral magnetic assembly 24.

Figure 13A:
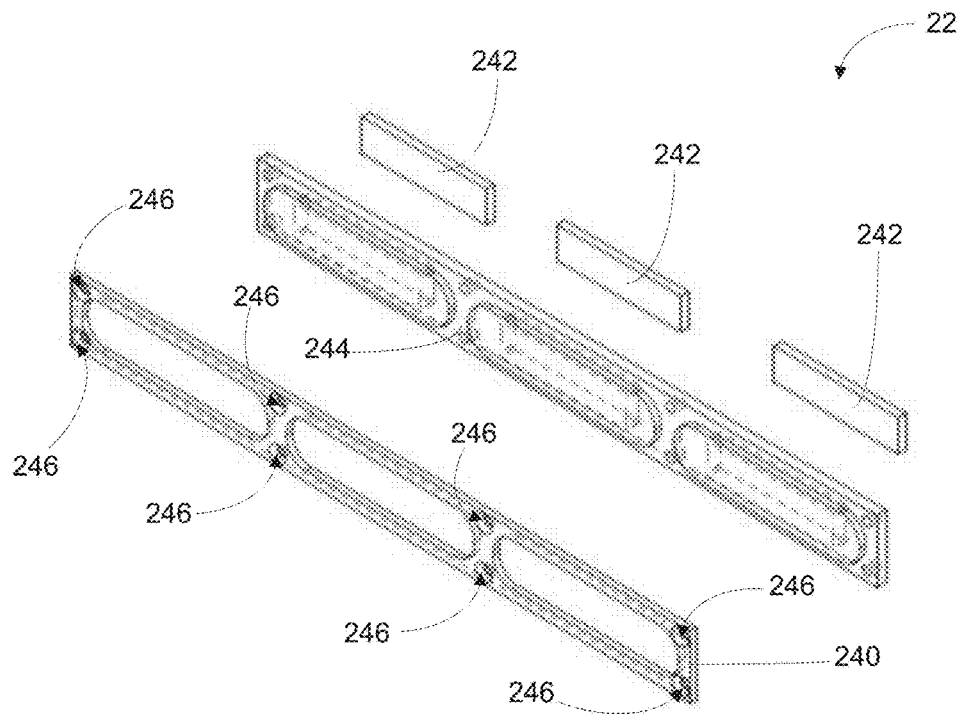
FIG. 13A shows an exploded view of the lateral magnet assembly.
Figure 13B:
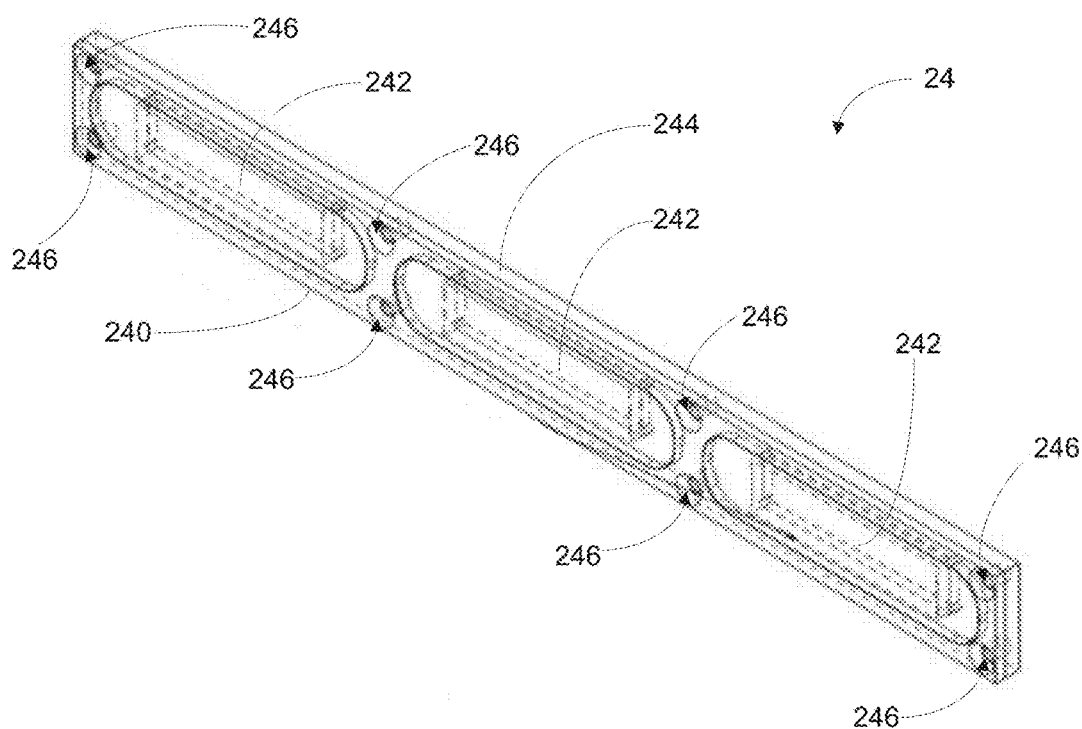
FIG. 13B illustrates a casing and faceplate of the lateral magnet assembly coupled together.

In order to further illustrate an example casing and faceplate, FIG. 13A and FIG. 13 B provide illustrative examples. Again, these figures are provided for illustration purposes and are not intended to be limiting in any fashion. FIG. 13A shows an exploded view of an example magnet assembly 22 in which magnets 242 may be inserted into a rear face of the casing 244 portion of the assembly. The faceplate 240 may then be fixedly attached to the casing 244 via the fastening structures 246 provided at each end and between the areas of the casing 244 that include magnets 242. FIG. 13B further illustrates how an example lateral magnetic assembly 24 may be constructed. In some example embodiments, the lateral magnetic assembly 24 may be constructed similarly to the magnet assembly described above with reference to FIG. 13A. In other embodiments, magnets of different and/or varying strength may be used. In further embodiments, magnets may be used in combination with other coupling devices such as clamps for example.

Figure 14:
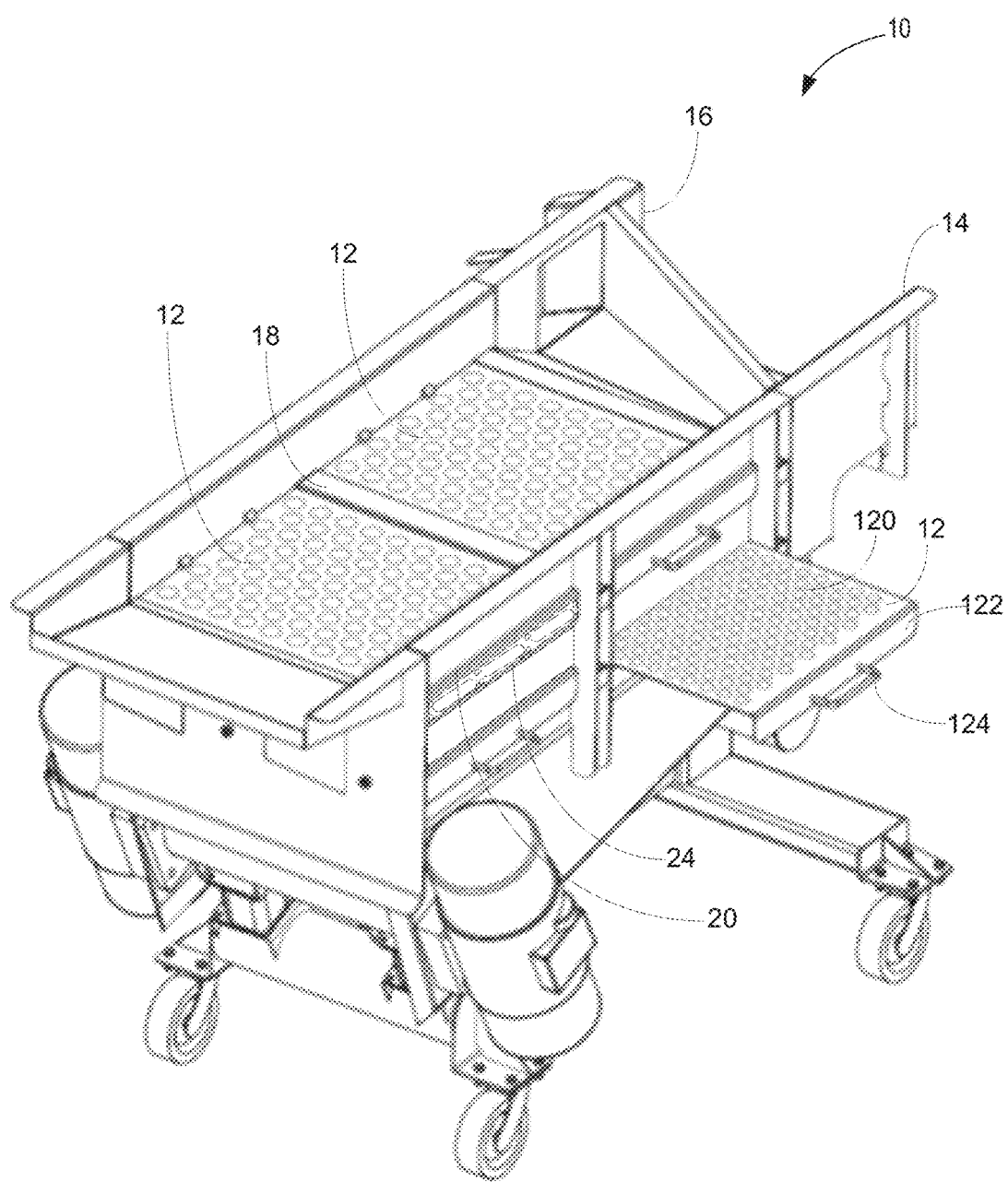
FIG. 14 illustrates another perspective view of the conveyor including a magnetically secured screen assembly of FIG. 1.

Similarly, FIG. 14 shows an example of a lateral magnet assembly 24 installed on the conveyor. As illustrated in the figure, the lateral magnet assembly may be fixedly attached to the front side wall 14 just under the slot 20 in which the magnetic screens 12 may be inserted. In this way, it may be possible to further reduce vibrations and noise due to rattling of the conveyor 10.

It should be appreciated that the above-described conveyor may be configured with use with one or more cooking or food processing devices in one embodiment. For example, the conveyor may be used with or adjacent to a fryer or other cooking system. In other examples, the conveyor may be integrated within a cooking or food-processing device.

In other example embodiments, the conveyor system with which the magnetically secured screen assembly may further be configured to perform separation point applications such as sorting products, finishing applications such as drying products or coating products, and other such applications which may benefit from the use of a screen conveyor system.

As one specific example, the conveyor system may be configured to sort goods and products based on their size by way of including a plurality of differently sized screens within the conveyor system. In this way, goods may be sorted effectively, efficiently, and quickly which may reduce the overall cost of goods production.

In another example embodiment, the conveyor system may be configured to dry products such as a dryer conveyor system. It will be appreciated that such a conveyor system may further be configured to perform coating processes. For example, a conveyor system may be configured at a first section the apparatus to first coat a product with a paint or lacquer prior to proceeding to a second section of the conveyor system configured to perform a drying process on the product. In this way, multiple stages of processing goods may be achieved using the same conveyor and magnetically secured screen assemblies.

It will be appreciated that the above example embodiments of a magnetically secured screen assembly and the conveyor systems with which the screen assemblies may be used are presented for illustrative purposes and in no way limit the scope of the disclosure.

It will be appreciated that within the scope of the present disclosure, the processing applications performed by the conveyor and magnetically secured screen assembly may include any of sorting, cooking, drying, coating, and any other application that may benefit from the use of a conveyor system or any combination thereof.

As one example, a conveyor for processing goods may include a conveyor support structure and a magnetically retained screen assembly, the magnetically retained screen assembly including one or more magnetic screens and one or more magnet assemblies, wherein the one or more magnet assemblies are configured to magnetically retain the one or more magnetic screens within the conveyor support structure. The conveyor may further include that the one or more magnet assemblies include one or more magnet assemblies configured to magnetically retain the one or more magnetic screens in a vertical direction. Another example embodiment may be configured to magnetically retain the one or more magnetic screens in a lateral direction. The magnet assemblies may be fixedly attached to an inner wall of the conveyor support structure in some examples. In another embodiment, the magnet used may be disposed 1/16 of an inch from a magnetic screen bearing surface of the casing.

In one example, the casing of the magnetic assemblies may be constructed of ultra-high molecular weight plastic. One embodiment may include wherein one or more magnetic assemblies include one or more faceplates covering an exterior surface of the casing. Thus, as described, an embodiment of the present disclosure may further contain one or more slots within a first sidewall of the conveyor support structure, each of the one or more slots configured to receive a magnetic screen, one or more screen supports fixedly attached to an interior surface of an opposing sidewall of the conveyor support structure; and wherein the one or more slots and one or more screen supports are aligned such that the magnetic screen may traverse the conveyor support structure from the first sidewall to the opposing sidewall supported within the conveyor support structure by one of the one or more slots at one end of the magnetic screen and one or more screen supports at the opposing end of the magnetic screen. In some embodiments, the conveyor support structure includes one or more dividers extending from a first sidewall to an opposing sidewall partitioning the interior volume of the conveyor support structure into two or more regions. The embodiment may further be configured with one or more upper magnetic screens located above one or more lower magnetic screens and may further include that the magnetic screens may be constructed from a steel alloy and may further be configured with one or more lateral magnet assemblies fixedly attached to an exterior surface of the first sidewall, each of the one or more lateral magnet assemblies located below a respective slot of the one or more slots, such that a magnetic coupling force between each of the one or more lateral magnet assemblies and a flange of a respective magnetic screen laterally retains the respective magnetic screen within the conveyor support structure.

One example of a magnetically retained screen assembly for a conveyor may contain one or more magnetic screens, one or more magnet assemblies, and one or more screen supports, wherein the one or more magnet assemblies are configured to attach to the conveyor and magnetically retain the one or more magnetic screens within the conveyor. Another embodiment may include the magnetically retained screen assembly wherein the one or more magnet assemblies including one or more magnet assemblies configured to magnetically retain the one or more magnetic screens in a vertical direction. A further example of the magnetically retained screen assembly, wherein the one or more magnet assemblies includes one or more magnet assemblies configured to magnetically retain the one or more magnetic screens in a lateral direction is also provided. For example, one embodiment of the magnetically retained screen assembly, wherein the one or more magnet assemblies are fixedly attached to an inner wall of a conveyor support structure may also be provided. As described, additional embodiments of the magnetically retained screen assembly may include wherein the one or more magnet assemblies include a magnet enclosed in casing such that the magnet is $1/16^{th}$ of an inch from a magnetic screen bearing surface of the casing. As disclosed above, the magnetically retained screen assembly, may include wherein the casing is constructed of ultra-high molecular weight plastic. In another embodiment of a magnetically retained screen assembly the one or more magnet assemblies may include one or more faceplates covering an exterior surface of the casing. A further example of a magnetically retained screen assembly may include the one or more magnetic screens are constructed of a magnetic stainless steel alloy.

The geometries, orientations, shapes, and relative dimensions have been presented and illustrated in simplified form. It will be appreciated that other geometries, orientations, shapes, and relative dimensions are anticipated. As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and sub combinations of the various features, functions, acts, and/or properties disclosed herein, as well as any and all equivalents thereof. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application Such claims, whether broader, narrower, equal, or different in scope to the original claims, also are regarded as included within the subject matter of the present disclosure.

The invention claimed is:

1. A conveyor for processing goods, comprising:
   a conveyor support structure, and
   a magnetically retained screen assembly, the magnetically retained screen assembly comprising:
      a magnetic screen; and
      a magnet assembly positioned in a magnetic attachment sidewall of the conveyor support structure, wherein the magnetic attachment sidewall extends in a vertical direction and the magnet assembly magnetically retains the magnetic screen within the conveyor support structure, and wherein the magnetic screen is slidable in a direction perpendicular to a conveyor length.

2. The conveyor for processing goods of claim 1, wherein the magnet assembly magnetically retains the magnetic screen in the vertical direction.

3. The conveyor for processing goods of claim 2, further comprising a magnet assembly positioned in a slotted front sidewall and magnetically retaining the magnetic screen, the slotted front sidewall including a slot receiving the magnetic screen.

4. The conveyor for processing goods of claim 1, wherein the magnet assembly is fixedly attached to an inner wall of the conveyor support structure.

5. The conveyor for processing goods of claim 1, wherein the magnet assembly comprises a magnet enclosed in a casing such that the magnet is $1/16^{th}$ of an inch from a magnetic screen bearing surface of the casing.

6. The conveyor for processing goods of claim 3, wherein the magnetic screen comprises a flange and a screen, and wherein the flange extends over the slot of the slotted front sidewall and is positioned at an exterior surface of the conveyor.

7. The conveyor for processing goods of claim 1, wherein the conveyor support structure further comprises:
 a slot within a slotted front sidewall of the conveyor support structure, the slot receiving the magnetic screen; and
 a screen support fixedly attached to an interior surface of a rear sidewall of the conveyor support structure;
 wherein the slot and the screen support are aligned such that the magnetic screen traverses the conveyor support structure from the slotted front sidewall to the rear sidewall and is supported within the conveyor support structure by the slot at one end of the magnetic screen and the screen support at an opposing end of the magnetic screen.

8. The conveyor for processing goods of claim 7, wherein the conveyor support structure includes a divider extending from the slotted front sidewall to the rear sidewall partitioning an interior volume of the conveyor support structure into two or more regions.

9. The conveyor for processing goods of claim 8, wherein the conveyor support structure includes an upper magnetic screen located above the magnetic screen.

10. The conveyor for processing goods of claim 1, wherein the magnetic screen is comprised of a magnetic stainless steel alloy.

11. The conveyor for processing goods of claim 7, wherein the conveyor support structure includes a second magnet assembly fixedly attached to an exterior surface of the slotted front sidewall, the second magnet assembly located below the slot, such that a magnetic coupling force between the second magnet assembly and a flange of the magnetic screen retains the magnetic screen within the conveyor support structure.

12. A magnetically retained screen assembly for a conveyor comprising:
 a magnetic screen;
 a magnet assembly extending along a length of a magnetic attachment sidewall and magnetically secured to the magnetic screen, the magnetic attachment sidewall extending in a vertical direction;
 a screen support in a rear sidewall positioned adjacent to the magnetic attachment sidewall, the screen support supporting the magnetic screen; and
 a slot positioned within and completely surrounded by a slotted front sidewall, the slot having the magnetic screen extending therethrough;
 wherein the magnetic screen comprises a flange and a screen perpendicular to the flange, where the flange extends in a vertical direction of the slotted front sidewall and is positioned at an exterior surface of the conveyor; and
 wherein the magnet assembly is attached to the conveyor and magnetically retains the magnetic screen within the conveyor.

13. The magnetically retained screen assembly of claim 12, wherein the magnet assembly magnetically retains the magnetic screen in the vertical direction.

14. The magnetically retained screen assembly of claim 12, further comprising a second magnet assembly positioned in the slotted front sidewall.

15. The magnetically retained screen assembly of claim 12, wherein the magnet assembly is fixedly attached to an inner surface of the magnetic attachment sidewall.

16. The magnetically retained screen assembly of claim 13, wherein the magnet assembly comprises a magnet enclosed in a casing such that the magnet is $1/16^{th}$ of an inch from a magnetic screen bearing surface of the casing.

17. The magnetically retained screen assembly of claim 16, wherein the magnet assembly includes a faceplate covering an exterior surface of the casing.

18. The magnetically retained screen assembly of claim 12, wherein the magnetic screen is comprised of a magnetic stainless steel alloy.

19. A conveyor for processing goods, comprising:
 a slotted front sidewall extending in a vertical direction and including a slot having a magnetic screen extending therethrough, the magnetic screen comprising a flange and a screen perpendicular to the flange, where the flange extends in the vertical direction of the slotted front sidewall and is positioned at an exterior surface of the conveyor;
 a rear sidewall having a support extending from an interior surface of the rear sidewall in a direction toward the slotted front sidewall; and
 a magnetic attachment sidewall extending in the vertical direction, including a first magnet assembly having a magnet enclosed in a casing, and having the slotted front sidewall and the rear sidewall connected thereto, the first magnet assembly magnetically attached to a side of the magnetic screen extending from the slotted front sidewall to the rear sidewall.

20. The conveyor of claim 19, further comprising a second magnet assembly positioned below the slot in the slotted front sidewall and magnetically attached to the magnetic screen.

* * * * *